(12) United States Patent
Robertson et al.

(10) Patent No.: US 12,703,328 B2
(45) Date of Patent: Aug. 11, 2026

(54) VEHICLE HAVING REAR AIR DUCT AND VENT ASSEMBLY AND METHOD

(71) Applicant: Ford Global Technologies, LLC, Dearborn, MI (US)

(72) Inventors: Michael Robertson, West Bloomfield, MI (US); Venkatesh Krishnan, Wayne, MI (US); Segundo Baldovino, Novi, MI (US); Sunil Reddy Patil, Troy, MI (US); Martin D. Lopez, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 18/492,153

(22) Filed: Oct. 23, 2023

(65) Prior Publication Data

US 2025/0128678 A1 Apr. 24, 2025

(51) Int. Cl.
*B60S 1/54* (2006.01)
*B60S 1/58* (2006.01)

(52) U.S. Cl.
CPC .. *B60S 1/54* (2013.01); *B60S 1/58* (2013.01)

(58) Field of Classification Search
CPC ... B60H 1/248; B60S 1/54; B60S 1/56; B60S 1/58; B60S 1/023
See application file for complete search history.

(56) References Cited

U.S. PATENT DOCUMENTS

| | | | | |
|---|---|---|---|---|
| 7,165,804 | B2 | 1/2007 | Shahbazi | |
| 9,217,864 | B2 | 12/2015 | Bell et al. | |
| 10,059,280 | B2 * | 8/2018 | Cooper | B60S 1/54 |
| 2011/0165831 | A1 | 7/2011 | Wang | |
| 2020/0298659 | A1 * | 9/2020 | Sakane | B60H 1/00 |
| 2020/0307357 | A1 * | 10/2020 | Nguyen | B60H 1/26 |

FOREIGN PATENT DOCUMENTS

| | | | | |
|---|---|---|---|---|
| GB | 1066372 A | * | 4/1967 | B60S 1/586 |
| JP | 2003118546 A | | 4/2003 | |

* cited by examiner

*Primary Examiner* — Allen R. B. Schult

(74) *Attorney, Agent, or Firm* — Vichit Chea; Price Heneveld LLP

(57) ABSTRACT

A vehicle having a body defining a cabin interior and having a window on a rearward facing surface, an air intake for receiving air from an exterior environment, an air blower for blowing the air in the cabin interior, and an air exhaust vent coupled to the body proximate the rearward facing window. A duct and vent assembly is operatively coupled to the exhaust vent for receiving the blown air and has a nozzle oriented to direct the blown air on the rearward facing window.

19 Claims, 8 Drawing Sheets

VEHICLE HAVING REAR AIR DUCT AND VENT ASSEMBLY AND METHOD

FIELD OF THE DISCLOSURE

The present disclosure generally relates to vehicle airflow and vent assemblies and, more particularly, relates a vehicle having a rear vent assembly that controls airflow directed at the rear of the vehicle.

BACKGROUND OF THE DISCLOSURE

Motor vehicles are commonly equipped with an air exhaust vent for venting pressurized air from the cabin interior of the vehicle. The air exhaust vent typically includes a one-way vent having one or more flaps for exhausting the air to the exterior environment. It may be desirable to provide for an air exhaust arrangement that provides other advantages for generating an airstream at the rear of the vehicle.

SUMMARY OF THE DISCLOSURE

According to a first aspect of the present disclosure, a vehicle includes a body defining a cabin interior and having a rearward facing surface, an air intake for receiving air from an exterior environment, an air blower for blowing the air in the cabin interior, an air exhaust vent coupled to the body proximate the rearward facing window, and a duct and vent assembly operatively coupled to the exhaust vent for receiving the blown air and having a duct outlet oriented to direct the blown air on the rearward facing surface.

Embodiments of the first aspect of the present disclosure can include any one or a combination of the following features:

- the vehicle has a rear window defining the rearward facing surface;
- the duct outlet is configured to direct blown air onto a camera;
- the duct outlet is configured to direct blown air onto a rear light;
- the duct outlet has a nozzle for directing the air in a desired stream;
- the air blower is part of an HVAC system;
- a user input for selecting a mode of operation for controlling the airflow output by the duct and vent assembly;
- the user input comprising a touchscreen.
- the selected mode of operation includes controlling the blower for controlling the airflow output by the duct and vent assembly; and
- the rearward facing window located on an upper portion of a rear wall of the vehicle.

According to a second aspect of the present disclosure, a method of blowing air on a rear window of a vehicle includes the method comprising the steps of receiving air from an external environment via an air intake, blowing the received air with an air blower into a cabin interior of the vehicle, exhausting the blown air through an air exit vent into a duct and vent assembly operatively coupled to the cabin interior of the vehicle, and directing the blown air from the duct and vent assembly onto the rear window of the vehicle.

Embodiments of the second aspect of the present disclosure can include any one or a combination of the following features:

- a step of receiving a user input command to control the airflow;
- the user input command controls the air blower;
- the rear window of the body defines the cabin interior;
- the duct and vent assembly is configured to direct blown air onto a camera;
- the duct and vent assembly includes a nozzle for directing the air in a desired stream;
- the duct and vent assembly is configured to direct blown air onto a rear light;
- the air blower is part of an HVAC system;
- the user input command selects a mode of operation for controlling the airflow output by the duct and vent assembly; and
- the user input comprising a touchscreen.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
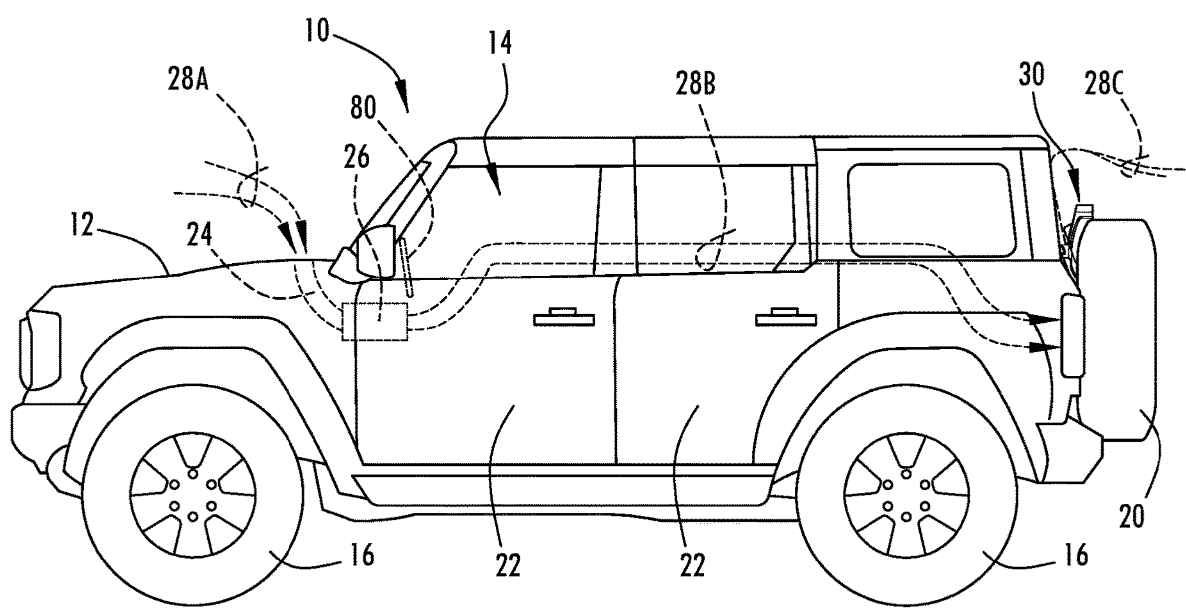
FIG. 1 is a side view of a motor vehicle equipped with a rear duct and vent assembly, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a rear duct and vent assembly and method of blowing air on the rear exterior vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
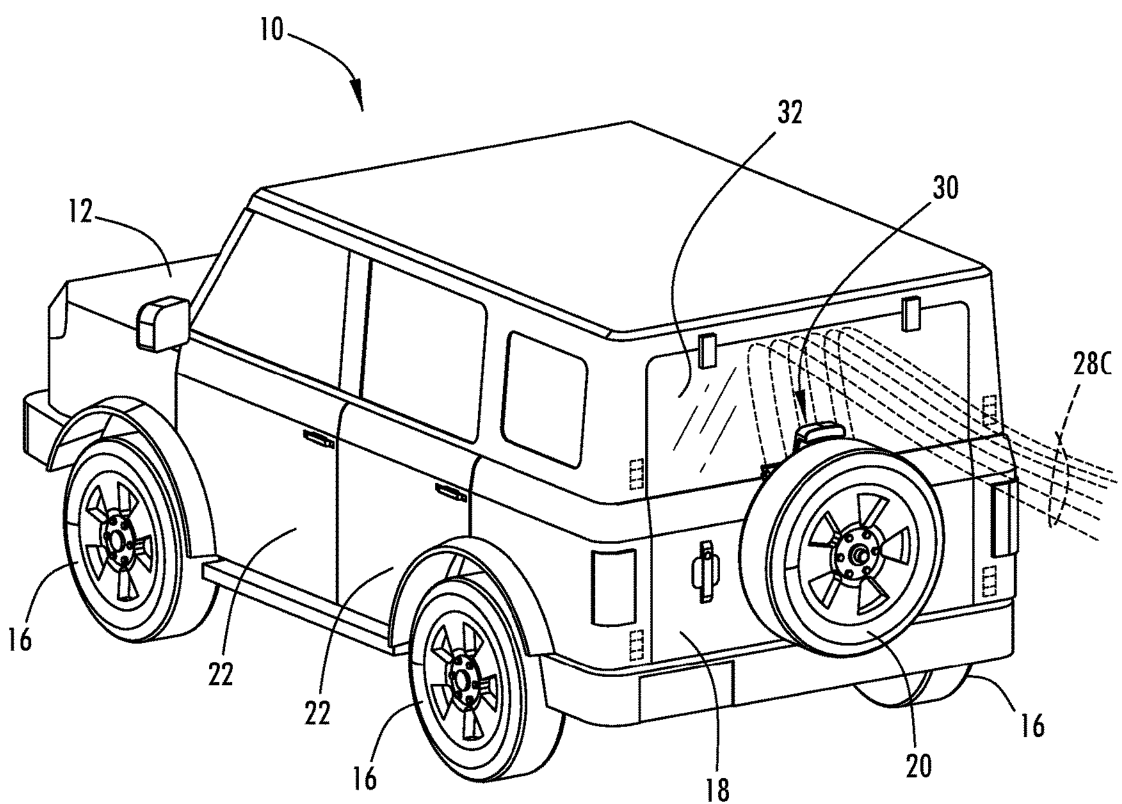
FIG. 2 is a rear perspective view of the motor vehicle shown in FIG. 1 further illustrating the airflow with the rear duct and vent assembly.

Referring to FIGS. 1 and 2, a wheeled automotive or motor vehicle 10 is generally illustrated having a vehicle body 12 defining a cabin interior 14. The cabin interior 14 generally includes passenger seating and other accommodations for transporting one or more occupants. The motor vehicle 10 shown and described herein is a wheeled motor vehicle having a plurality of wheel and tire assemblies 16, particularly four wheel and tire assemblies 16 mounted onto the axles of the motor vehicle 10. The motor vehicle 10 has front and rear side doors 22 on both lateral sides of the body 12 and a rear door 18 as the rear end of the motor vehicle 10 that allows access to the rear end of the cabin interior 14. The motor vehicle 10 also has a rear window 32 which provides a rearward facing surface on the rear end generally located above the rear door 18 or integrated into the rear door 18. The motor vehicle 10 further includes a spare wheel and tire assembly 20 mounted onto a mount on the exterior side of the rear door 18, according to one example. The spare wheel and tire assembly 20 could otherwise be mounted onto the mount on a rear wall of the motor vehicle 10.

The motor vehicle 10 has an outside air intake 24, which may include an air inlet with one or more air flow flaps for controllable receiving air intake 28A, which is the flow of ambient air in the outside environment generally shown received in a front portion of the motor vehicle 10. The outside air intake 24 is coupled to a blower system 26 that may have a fan, such as a heating ventilation air conditioning (HVAC) blower system, that is used to blow air for the HVAC system. Ambient air received by the outside air intake 24 may be controllably blown by the blower system 26 to pressurize the air within the cabin interior 14, as shown by interior pressurized air 28B. The pressurized air within the cabin interior 14 may have an air pressure greater than the atmospheric pressure of the ambient air in the environment outside the motor vehicle 10. The pressurized air within the cabin interior 14 may be exhausted via a rear duct and vent assembly 30 at the rear end of the motor vehicle 10 which generally directs and blows the air exhaust 28C onto a rearward facing surface shown as a rear window 32 and further onto one or more optics including a rearview camera and one or more lighting devices including a center high mounted stop lamp (CHMSL) lens.

The motor vehicle 10 may include one or more user selectable control inputs for controlling the airflow, such as blower speed, vent air direction, and temperature, within the motor vehicle 10 and exhausted onto the rear end exterior of the motor vehicle 10. According to one embodiment, a touch screen display may be employed to present a menu selection for allowing an occupant to select a desired airflow mode. For example, a user selectable offroad dusty conditions mode may allow a user to select a first tailored HVAC airflow mode for improved window and sensor cleaning which may enhance or maximize the blower speed and control of the vents to maximize airflow traveling to the rear exterior of the motor vehicle 10. According to another example, a second user selectable Aero mode may be employed in which a user may select the Aero mode when the motor vehicle 10 is traveling at a high speed to enable a max HVAC Aero mode which maximizes the blower speed, changes the vents only to maximize airflow traveling to the rear of the vehicle, and may turn on the additional HVAC system. According to a further example, a third user selectable max defrost mode may be selected which in conjunction with a normal max defrost mode sets the blower speed to an increased or maximum speed and directs airflow only to the front windshield defroster vents and sets the temperature to a high temperature, and allows the airflow to travel through the cabin interior 14 and exit through the rear duct and vent assembly 30 to help defrost the rear window 32 on the outside of the motor vehicle 10. In addition, the rear window 32 may have a hydrophobic coating on the exterior surface to further enhance and maintain a clean rear window 32 in addition to the exterior airflow blown thereon.

Figure 3:
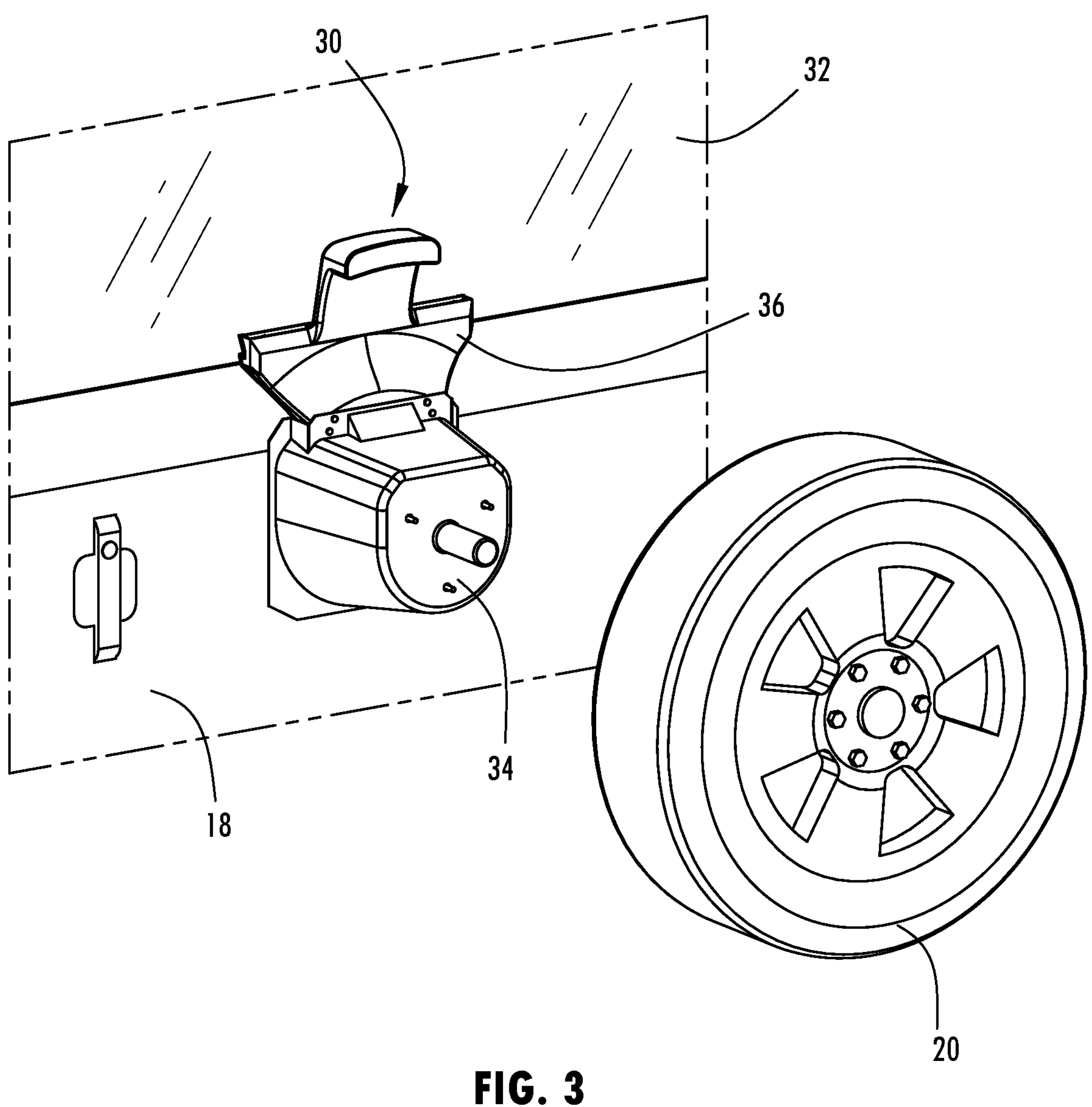
FIG. 3 is a rear perspective view of the rear duct and vent assembly integrated into a spare tire mount on the rear door with the spare tire shown removed.
Figure 4:
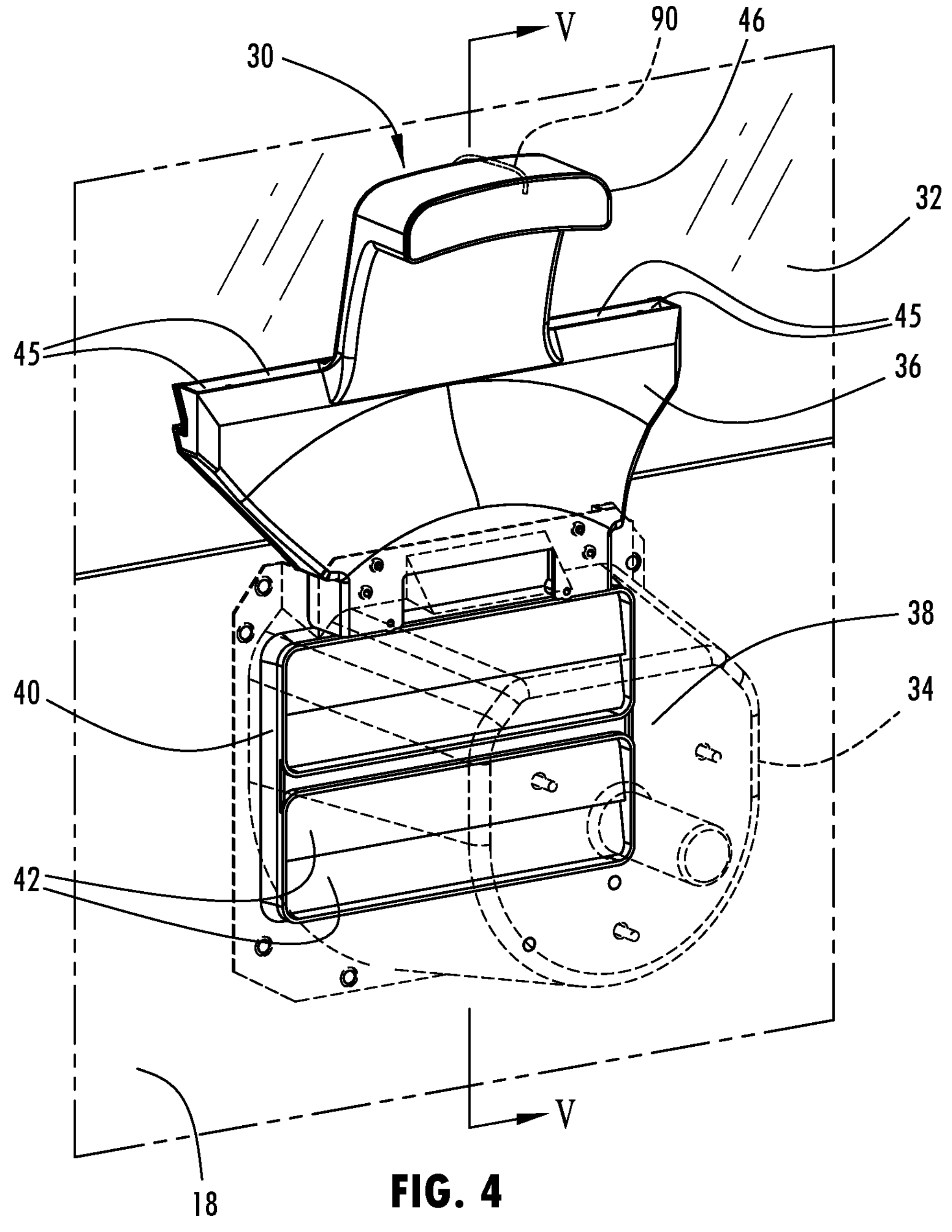
FIG. 4 is a rear perspective view of the rear duct and vent assembly integrated in the spare tire mount.
Figure 5:
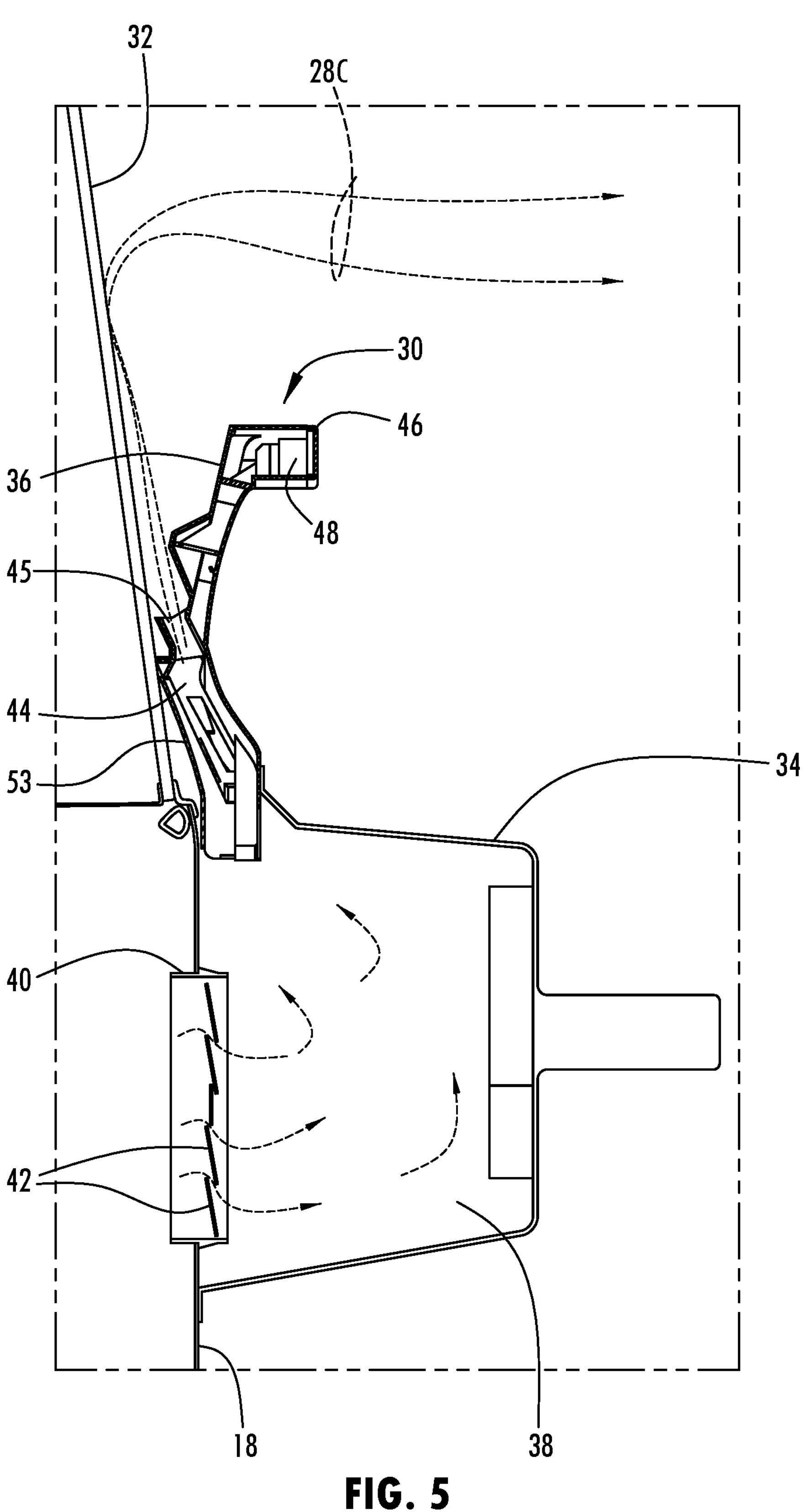
FIG. 5 is a cross-sectioned view taken through line V-V of FIG. 4 further illustrating the rear duct and vent assembly integrated in the spare tire mount.

The rear duct and vent assembly 30 is further illustrated in FIGS. 3-5. In the embodiment shown, the rear duct and vent assembly 30 is integrated in the spare tire mount 34 on the rear door 18 defining a lower rear wall of the motor vehicle 10. The spare tire mount 34 includes a supporting structure for holding the spare wheel and tire assembly 20. In addition, the spare tire mount 34 is mounted to the rear door 18 of the motor vehicle 10 in the location that houses the rear exhaust vent for exhausting airflow from the cabin interior 14 at the rear of the motor vehicle 10.

The spare tire mount 34 includes a bracket 36 which includes air ducts and a vent in the form of nozzles 45 for directing and exhausting pressurized air exiting the cabin interior 14 onto the upper rear surface defined by the rear window 32 of the motor vehicle 10 and other locations such as those containing optics, for example. The spare tire mount 34 defines an enclosure on the inside 38 defining the air ducts and is operatively coupled to a cabin air extractor vent 40 which includes a plurality of vent flaps 42. The plurality vent flaps 42 may be one-way airflow valves that open outward due to a pressure differential when the air pressure on the inside of the cabin interior 14 is greater than the atmosphere pressure in the surrounding exterior environment. This allows the higher pressure airflow from the cabin interior 14 of the motor vehicle 10 to exit the motor vehicle 10 into the interior space 38 of the spare tire mount 34 and be exhausted via nozzles towards the rear window of the motor vehicle 10. The pressurized air within the interior space 38 of the spare tire mount 34 is then redirected along air ducts 44 provided in the bracket 36. The air ducts 44 may include a series of generally parallel air ducts that allow airflow to flow from the space 38 into duct inlets and through the ducts 44 and exiting duct outlets which includes nozzles 45 in a direction towards the rear exterior surface of the motor vehicle 10, including onto the rear window 32 and onto other optics such as the CHMSL 46 and camera 48 seen in FIG. 6. Another airflow path may be provided by a hose 90 to direct at least some of the airflow from the ducts 44 to the CHMSL 46 lens and camera 45 as shown in FIG. 4.

Figure 6:
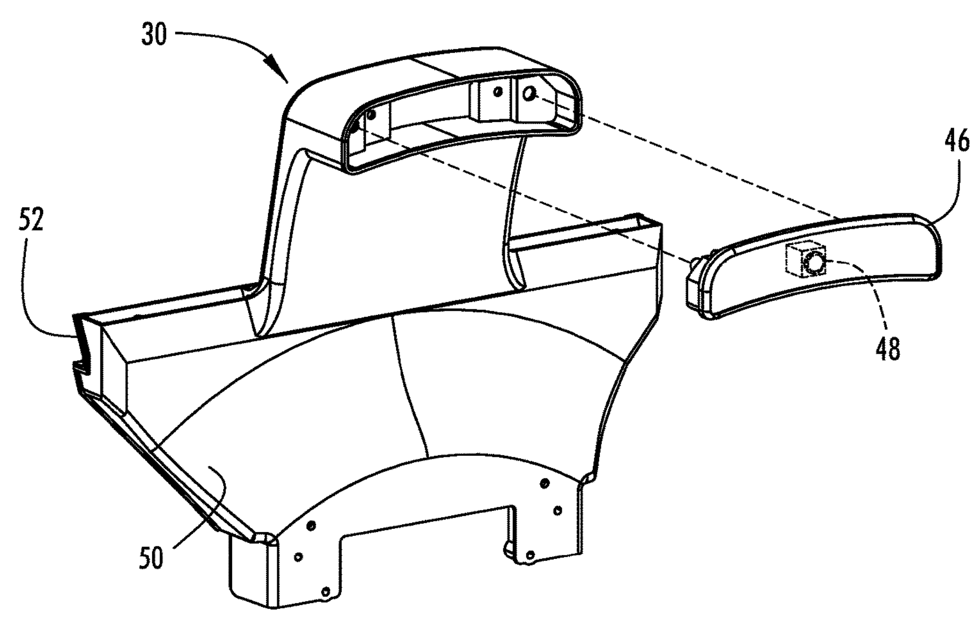
FIG. 6 is a rear perspective view of the rear duct and vent assembly.
Figure 6A:
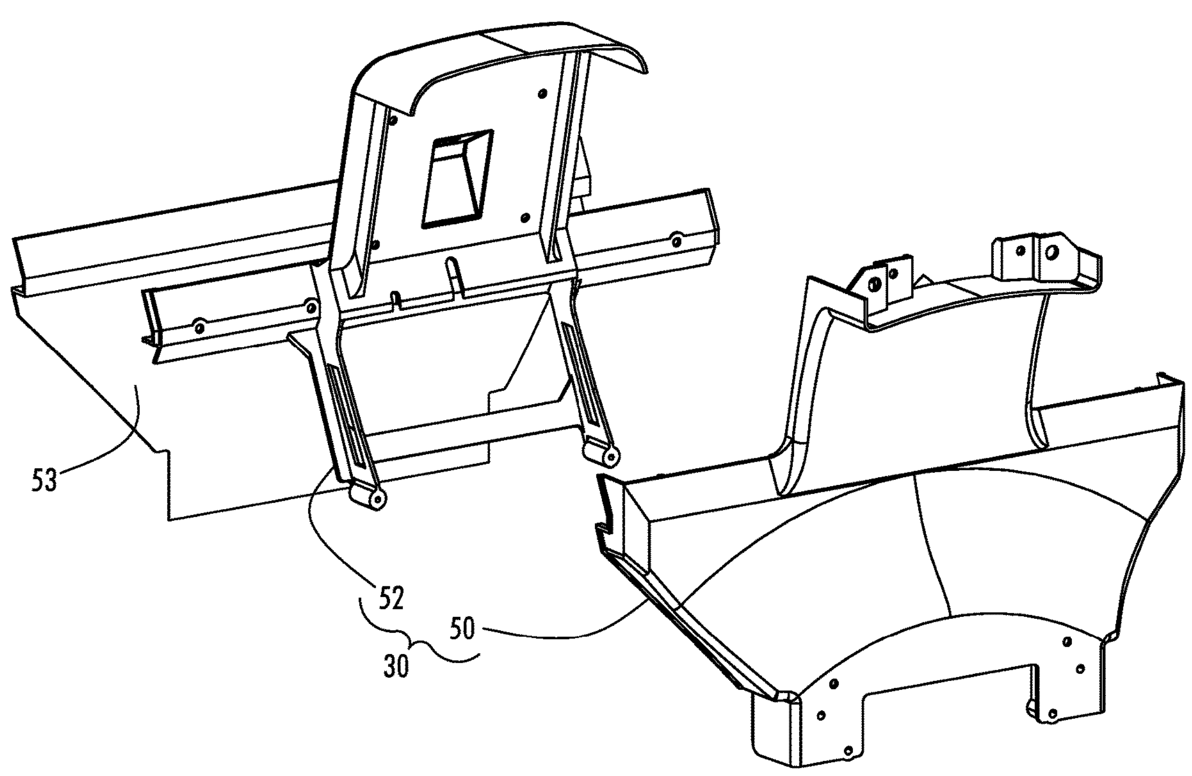
FIG. 6A is an exploded view of the rear duct and vent assembly shown in FIG. 6.
Figures 7, 7A:
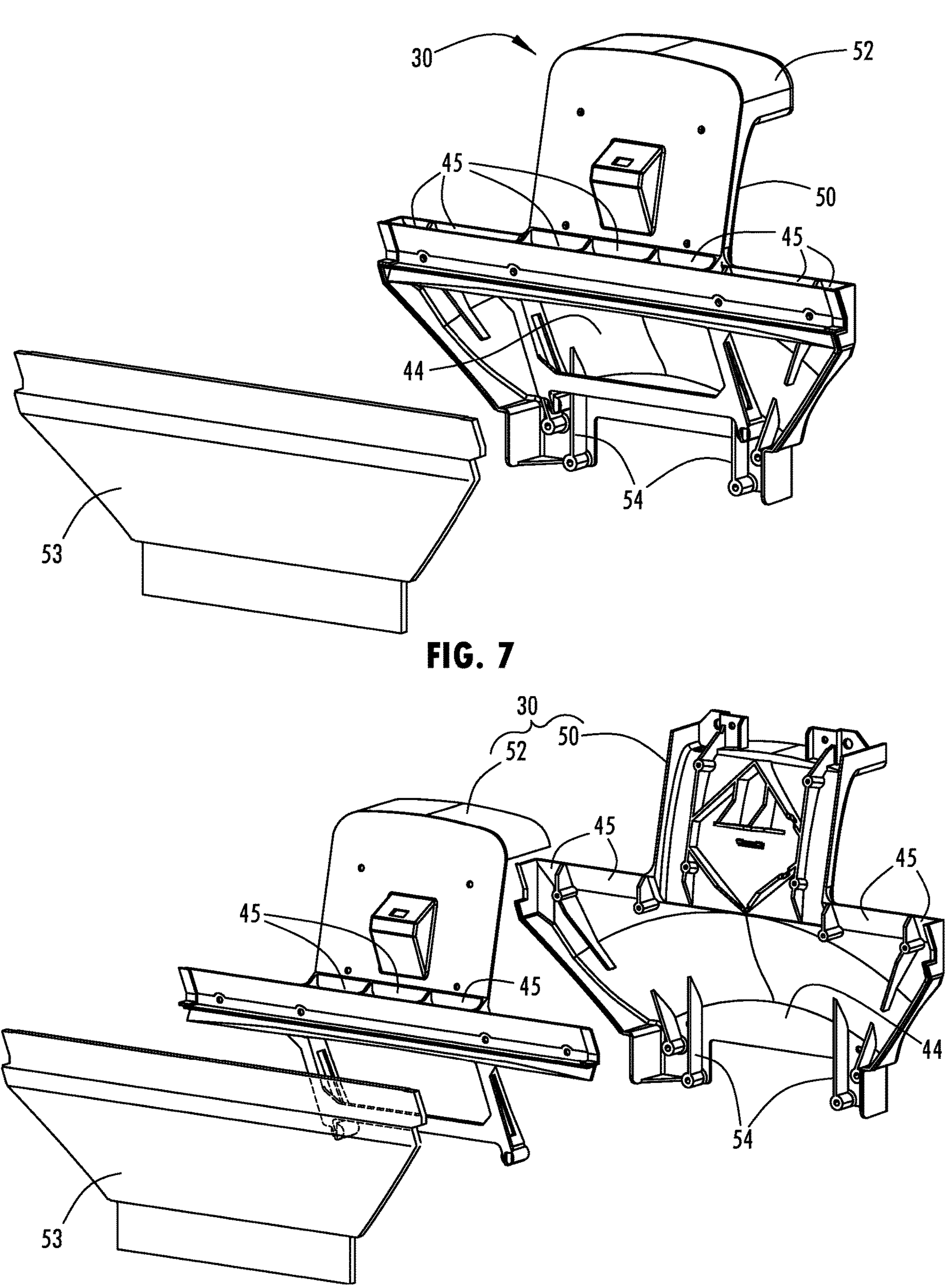
FIG. 7 is a front perspective view of the rear duct and vent assembly.
FIG. 7A is a front exploded perspective view of the rear duct and vent assembly.

Referring to FIGS. 6-7A, the air ducts 44 are formed in the air duct and vent assembly 30 defined by a rear housing 50 and a front wall 53 on the front housing 52 that essentially is connected together with one or more air ducts 44 formed therebetween. The air ducts 44 are operatively coupled to one or more nozzles 45 that allows the pressurized air to be exhausted in a directed path. The exhaust and may be controlled with various air directors 54 such as vanes which may be adjusted in position by a controller to control the airflow.

Figure 8:
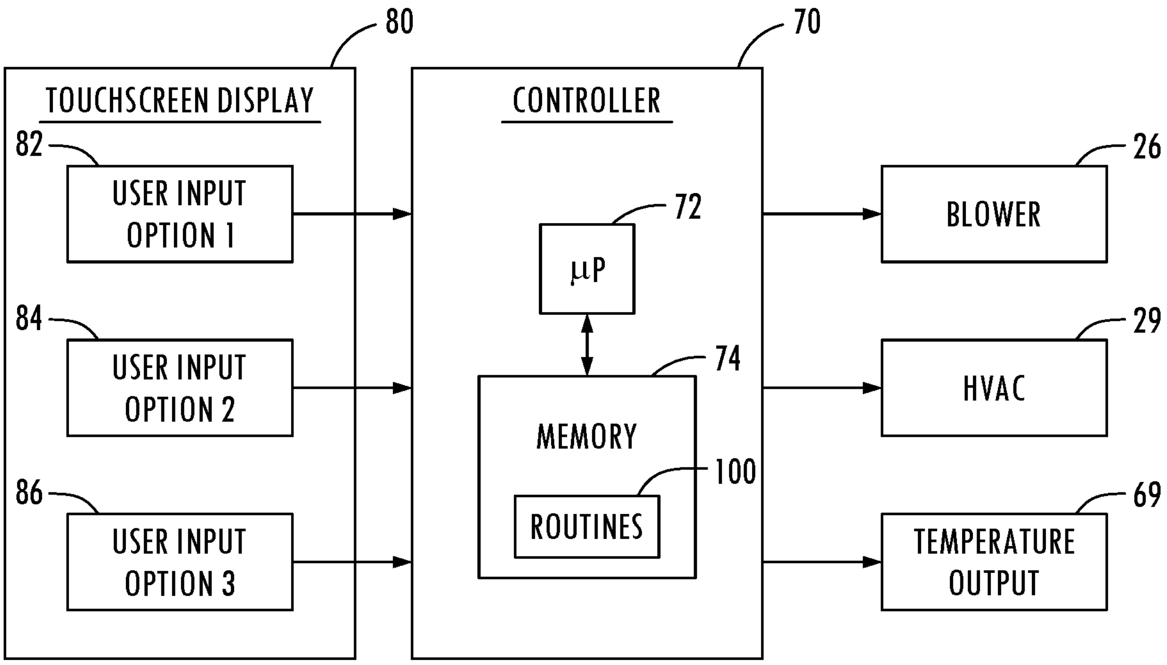
FIG. 8 is a block diagram illustrating controls for controlling the airflow pursuant to user inputs.
Figure 9:
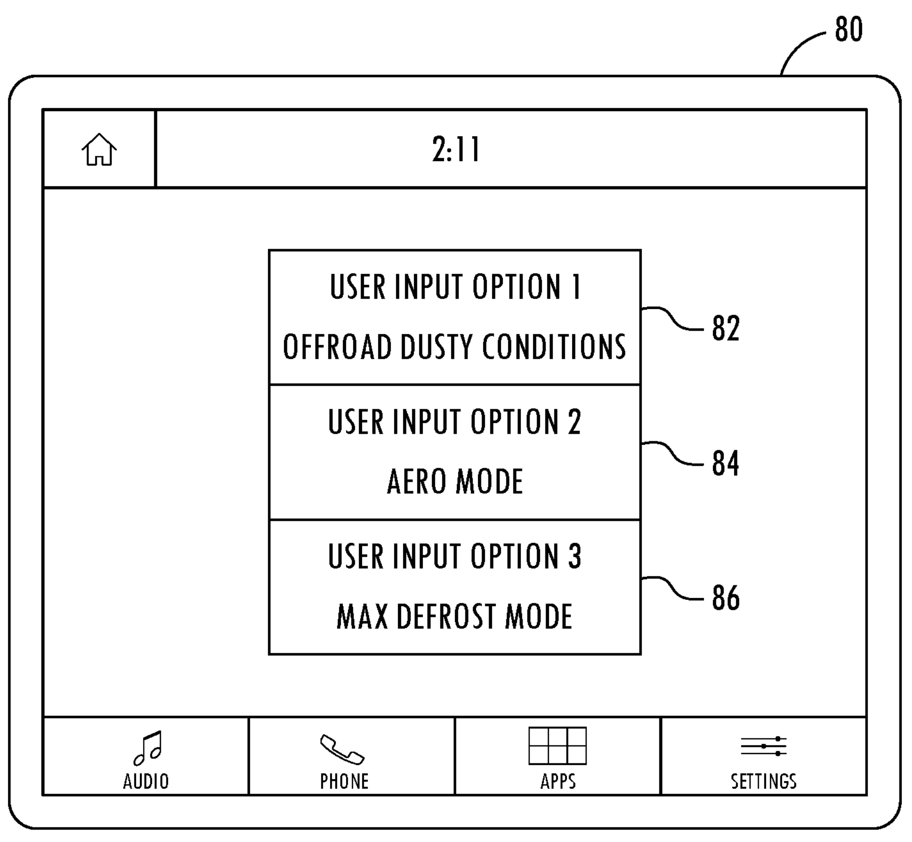
FIG. 9 is a front view of a touchscreen display illustrating available user inputs for controlling the airflow.

Referring to FIG. 8, the control arrangement for controlling air blown and exhausted with the duct and vent assembly 30 is illustrated, according to one example. Included is a controller 70 having a microprocessor 72 and memory 74, according to one example. The controller 70 may include shared or dedicated control circuitry including analog and/or digital circuitry. Stored within memory 74 and executed by the microprocessor 72 may be one or more routines 100 configured to control the airflow pursuant to user selectable inputs. The controller 70 communicates with a user input device such as a touch screen display 80 as is shown in FIG. 9. The touchscreen display 80 may serve as an input device to receive user inputs to command the air blower 26 to generate airflow in the cabin interior by which it is exhausted via the duct and vent assembly 30 at the rear end of the vehicle. The touchscreen display 80 may include three user inputs in the example shown. Included is a user input option 1 82, which may also be referred to as the user selectable offroad dusty conditions mode input that provides HVAC airflow for improved rear window and sensor cleaning. Also included is a user input option 2 84 which may also be referred to as the Aero mode which maximizes the blower speed and maximizes the airflow to the rear of the vehicle and may turn on an additional HVAC system. Further included is a user input option 3 86, also referred to as a user selectable max defrost mode, which sets the blower 26 speed to a maximum speed and directs airflow only to the front windshield defroster vents and sets the temperature to high and allows for the airflow to travel throughout the cabin and exit the rear duct and vent assembly 30.

The controller 70 receives one of the user selectable inputs 82, 84, or 86 from the touchscreen display 80 or other input devices and provides the control outputs to the HVAC system 29, the blower 26, and the temperature output 69 to control the airflow as desired pursuant to the selected mode. It should be appreciated that other user selectable inputs and modes may be employed in conjunction with the blower 26, the HVAC system 29, and the duct and vent assembly 30.

Accordingly, the rear duct and vent assembly 30 and the associated controls provided on the motor vehicle 10 advantageously allows for pressurized airflow to be controlled and exhausted onto a rear exterior surface of the motor vehicle 10. The airflow may be exhausted onto an exterior side of the rear window to keep the rear window 32 clean of dirt and moisture, or to defrost or defog the rear window 32. In addition, the airflow exhausted by the rear duct and vent assembly 30 advantageously may enhance the airflow flowing across the motor vehicle 10 when the motor vehicle 10 is traveling at higher speeds. Further, the airflow exhausted in the rear duct and vent assembly 30 may also be directed to other optics on the rear exterior of the motor vehicle 30, such as, for example, one or more cameras and lighting devices, such as the CHMSL 46 at the rear of the motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a body defining a cabin interior and having a rear wall and a rear window defining a rearward facing surface;

an air intake for receiving air from an exterior environment;

an air blower for blowing the air in the cabin interior;

an air exhaust vent coupled to the rear wall of the body proximate the rearward facing surface; and a duct and vent assembly operatively coupled to the exhaust vent for receiving the blown air and having a duct outlet oriented to direct the blown air on the rearward facing surface defined by the rear window.

2. The vehicle of claim 1, wherein the duct outlet is configured to direct blown air onto a camera.

3. The vehicle of claim 1, wherein the duct outlet is configured to direct blown air onto a rear light.

4. The vehicle of claim 1, wherein the duct outlet has a nozzle for directing the air in a desired stream.

5. The vehicle of claim 1, wherein the air blower is part of an HVAC system.

6. The vehicle of claim 1, wherein the user input comprises a touchscreen.

7. The vehicle of claim 1, wherein the rear window is located on an upper portion of a rear wall of the vehicle.

8. The vehicle of claim 1, further comprising a user input for selecting a mode of operation for controlling the airflow output by the duct and vent assembly.

9. The vehicle of claim 8, wherein the selected mode of operation includes controlling the blower for controlling the airflow output by the duct and vent assembly based on the selected mode of operation, and wherein the selected mode of operation comprises one of a dusty conditions mode that provides airflow for cleaning and a defrost mode that provides airflow and sets a temperature for the airflow directed on the rearward facing surface.

10. The vehicle of claim 9, wherein the selected mode of operation further includes an aero mode for enhancing airflow while the vehicle is traveling at higher speeds.

11. A method of blowing air on a rear window of a vehicle, the method comprising the steps of:

receiving air from an external environment via an air intake;

blowing the received air with an air blower into a cabin interior of the vehicle;

exhausting the blown air through an air exit vent into a duct and vent assembly operatively coupled to a rear wall of the cabin interior of the vehicle; and directing the blown air from the duct and vent assembly onto the rear window of the vehicle.

12. The method of claim 11, wherein the rear window is a rear window of the body defining the cabin interior.

13. The method of claim 11, wherein the duct and vent assembly is configured to direct blown air onto a camera.

14. The method of claim 11, wherein the duct and vent assembly includes a nozzle for directing the air in a desired stream.

15. The method of claim 11, wherein the duct and vent assembly is configured to direct blown air onto a rear light.

16. The method of claim 11, wherein the air blower is part of an HVAC system.

17. The method of claim 11, wherein the user input comprises a touchscreen.

18. The method of claim 11, further comprising the step of:

receiving a user input command to control the airflow, wherein the user input command controls the air blower, wherein the user input command selects a mode of operation for controlling the airflow output by the duct and vent assembly, and wherein the selected mode of operation comprises one of a dusty conditions mode that provides airflow for cleaning and a defrost mode that provides airflow and sets a temperature for the airflow directed on the rearward facing surface.

19. The method of claim 18, wherein the selected mode of operation further includes an aero mode for enhancing airflow while the vehicle is traveling at higher speeds.

* * * * *